United States Patent [19]

Hinshaw

[11] 4,322,196
[45] Mar. 30, 1982

[54] SOUP RETORT

[76] Inventor: Carl F. Hinshaw, P.O. Drawer AC, Lake Wales, Fla. 33853

[21] Appl. No.: 143,217

[22] Filed: Apr. 24, 1980

[51] Int. Cl.³ .............................................. A23L 3/12
[52] U.S. Cl. ..................................... 414/149; 99/371; 193/40; 414/147; 414/150; 414/152
[58] Field of Search ............... 414/147, 149, 150, 152, 414/208, 216; 99/371; 193/32, 38, 40, 41

[56] References Cited

U.S. PATENT DOCUMENTS

| | | | |
|---|---|---|---|
| 898,002 | 9/1908 | Pillmore et al. | 99/371 |
| 2,065,752 | 12/1936 | Schmidt | 414/152 |
| 2,720,302 | 10/1955 | Madden | 193/38 X |
| 3,774,792 | 11/1973 | Willmroth | 414/421 X |

Primary Examiner—Robert G. Sheridan
Attorney, Agent, or Firm—Wheeler, House, Fuller & Hohenfeldt

[57] ABSTRACT

A cooking retort for soup or the like in which the individual cans are stored in storage rack clusters arranged around a generally horizontal axis. The retort employs a power cylinder to tilt the retort and thus the storage racks to enable inclination of the racks to facilitate the loading and tilting of the racks to facilitate unloading. In addition, a hexagonal pattern of can rack clusters is provided to enhance cooking capacity of cans.

4 Claims, 7 Drawing Figures

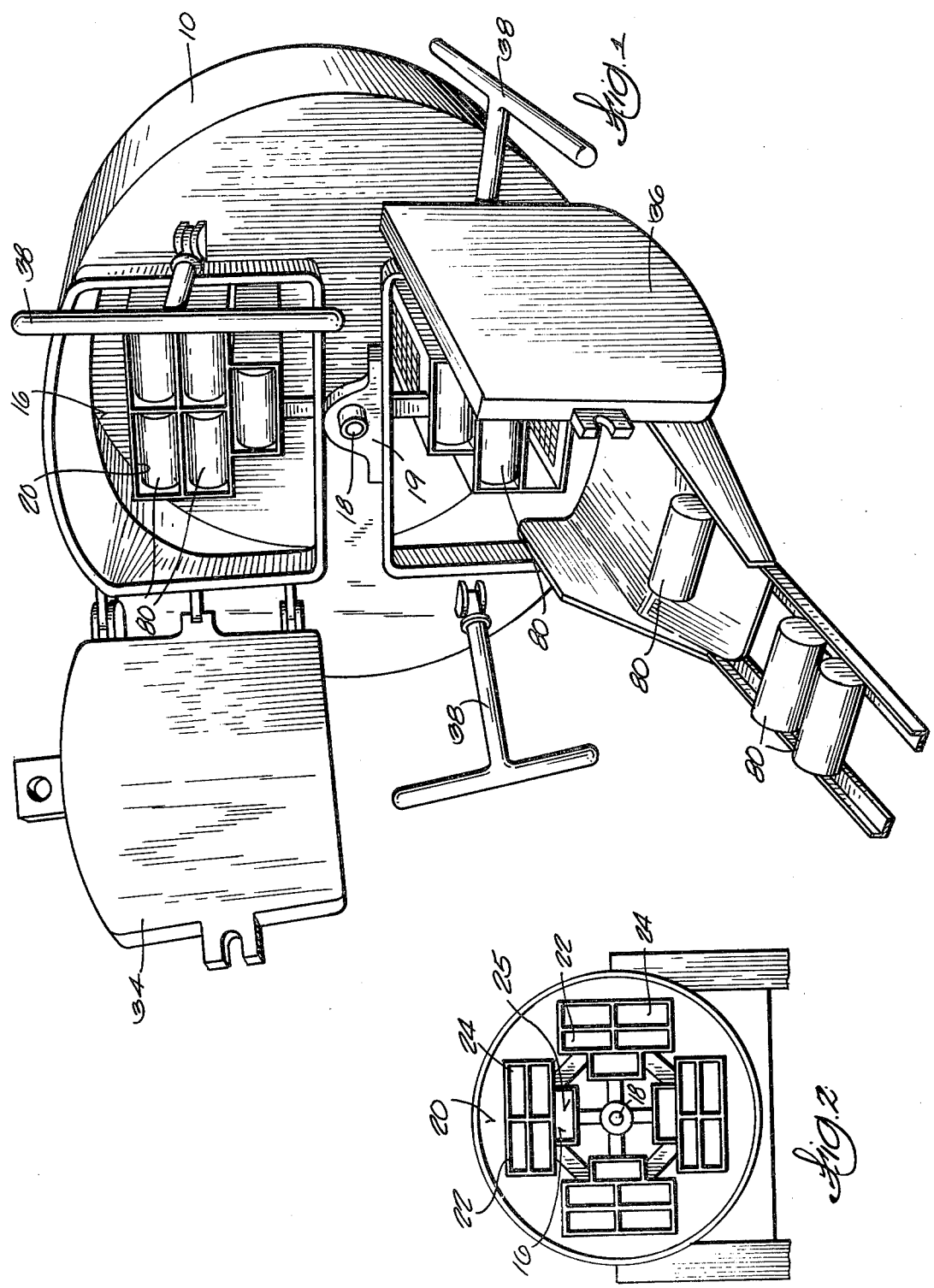

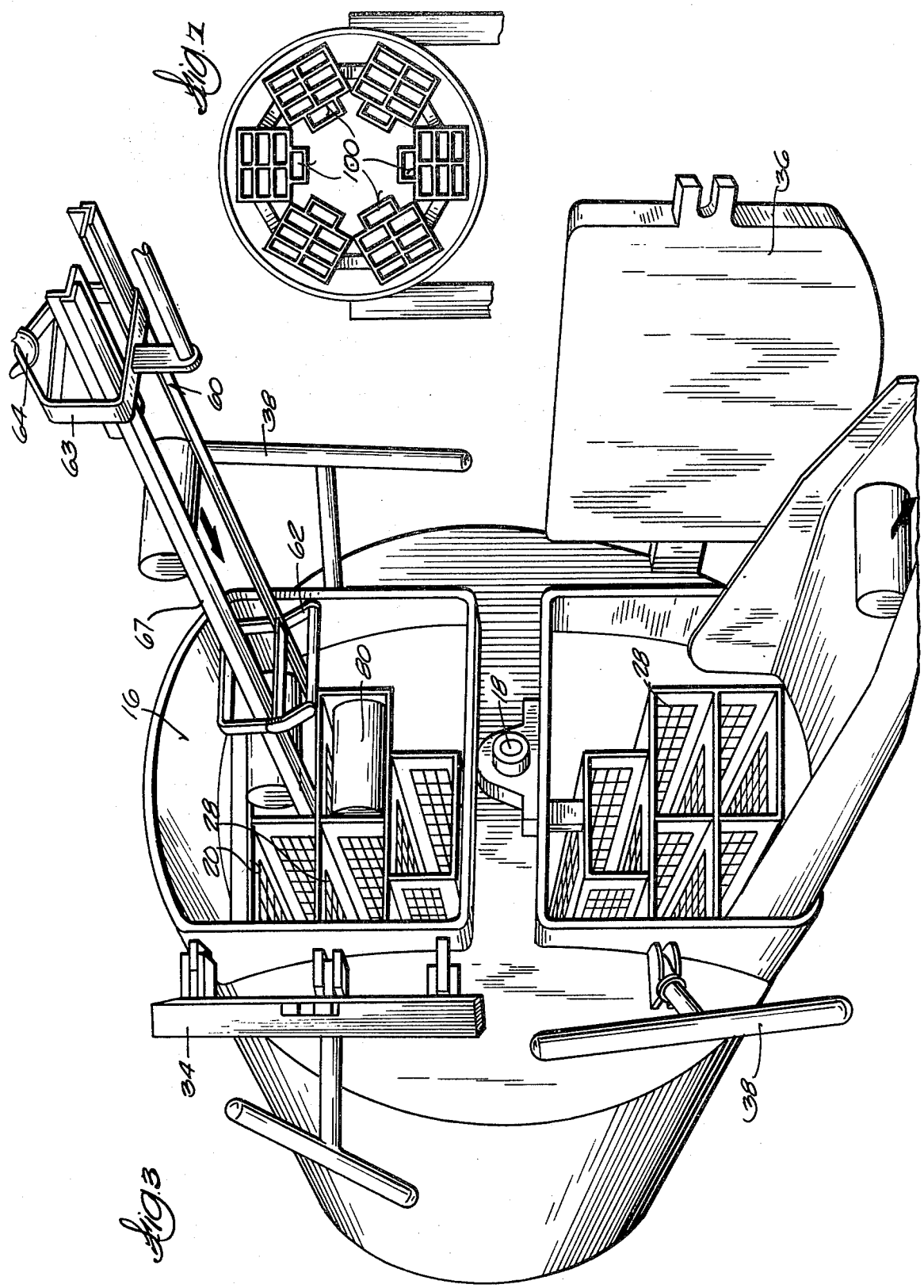

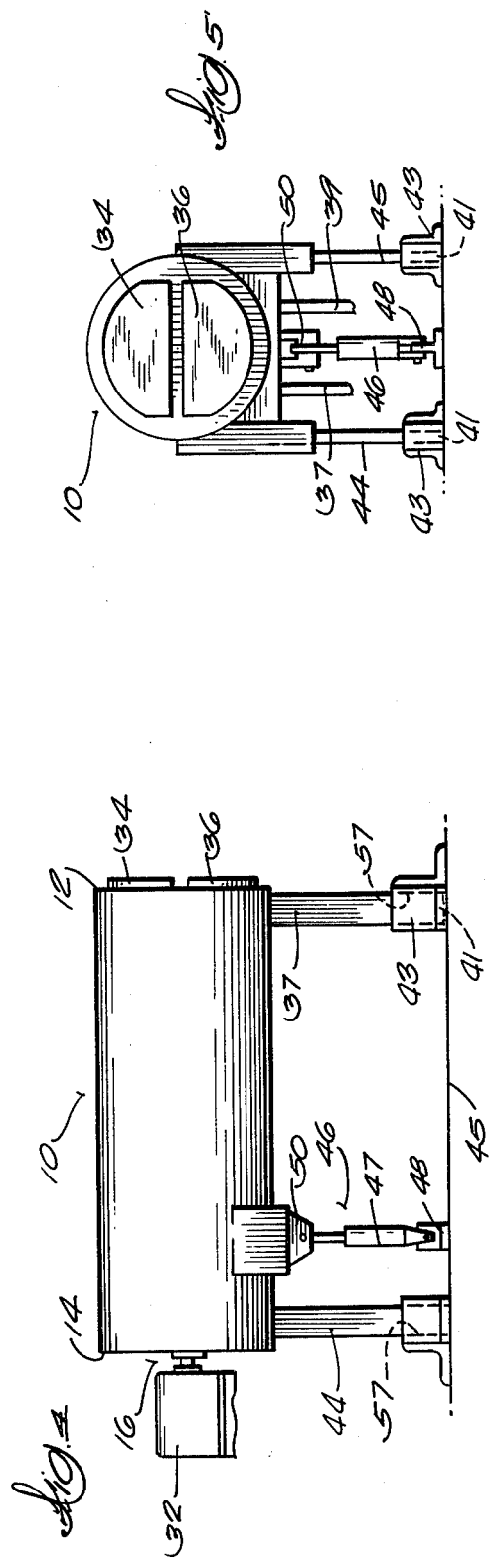
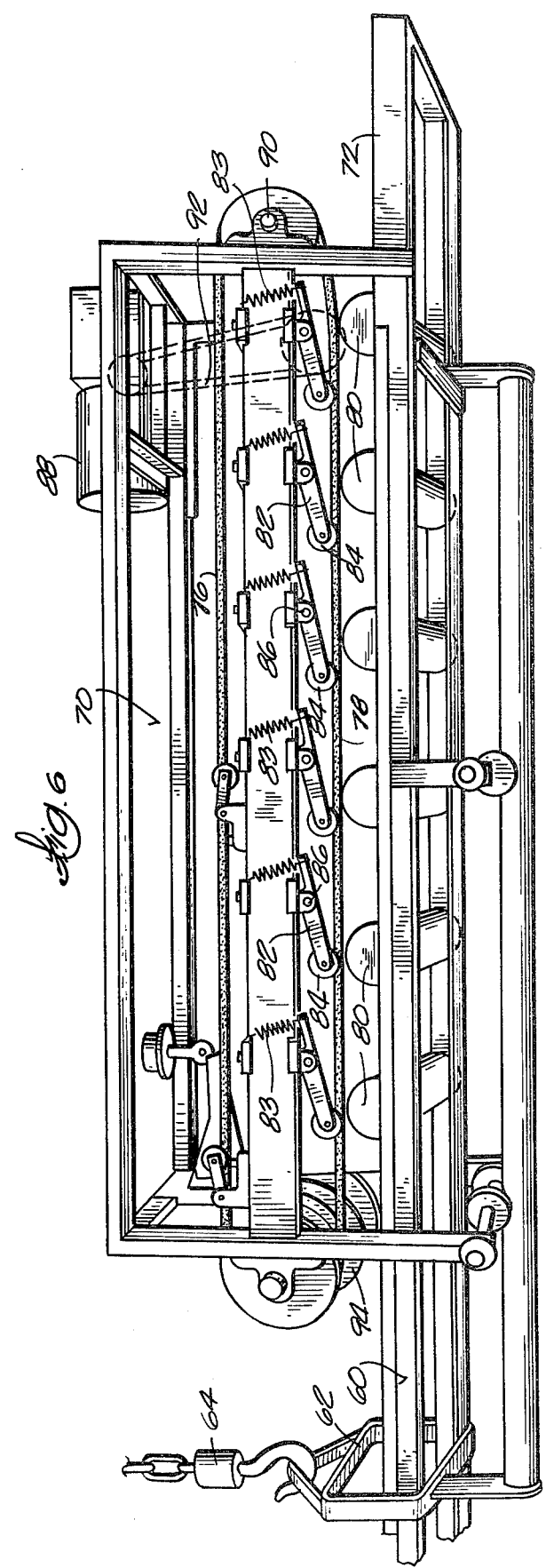

SOUP RETORT

BACKGROUND OF THE INVENTION

In the processing of soup and sauces and other canned foods, cooking is required. Various techniques have been involved to cook numerous cans at one time. Applicant herein has developed and used in the past a cooking retort in which clusters of elongated can racks are arranged around a generally rotational axis in a rotor. In applicant's prior art device, the storage racks were inclined so that the cans could be delivered to inclined racks and when the inclined racks were rotated 180°, they would be inclined downwardly and outwardly to facilitate unloading. This arrangement was workable, but there was no way of conveniently adjusting the angle of inclination of the storage racks once the retort was fabricated and assembled.

SUMMARY OF THE INVENTION

The invention provides a retort in which the retort is tiltable about its legs, using a power cylinder to change the angle inclination to the desired angle to facilitate loading and unloading of the cans. More than one cluster of can compartments can be loaded at the same time by using both the loading and unloading openings into the retort.

In addition, the invention provides a decelerating mechanism to slow down and maintain spacing of cans as they are introduced to the retort. In this regard, an overhead conveying belt under tension grips the cans and moves the cans through the conveying section at a pre-selected rate that will provide the desired rolling speed into the retort can compartments to avoid damage to the cans.

Further objects, advantages and features of the invention will become apparent from the disclosure.

DESCRIPTION OF THE DRAWINGS

FIG. 1 is a diagrammatic front perspective view of a soup cooking retort in accordance with the invention.

FIG. 2 is a diagrammatic front view.

FIG. 3 is a perspective view similar to FIG. 1, showing the loading conveyor.

FIG. 4 is a side elevational view in reduced scale of the soup retort.

FIG. 5 is an end view of the retort shown in FIG. 4.

FIG. 6 is an enlarged view of a decelerator conveyor used for loading the containers in the retort.

FIG. 7 shows a modified embodiment of the retort in which there are six clusters of can storage racks rather than four.

PREFERRED EMBODIMENT OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, the cooking retort includes a cylindrical outer shell or housing 10 (FIG. 1) which has end walls 12 and 14 (FIG. 2) which rotatably support a rotor 16 (FIG. 3). A shaft 18 journaled in bearings 19 is carried by the end walls 12 and 14. The rotor 16 includes elongated can storage compartments 20 which are arranged around the shaft in a pattern to maximize the can capacity within the outer casing and facilitate loading and unloading. As shown in FIG. 2, the compartments 20 are arranged in two side by side stacks 22 and 24 with an overlapping single compartment 25 to form a single storage cluster or complement. In FIG. 2, four of these complements are arranged within the interior of the housing 10. The walls defining the compartments are foraminous and have openings 28, as shown in FIG. 3, to expose the cans to the heating medium, such as steam, typically employed for cooking purposes. Other geometric arrangements, such as the hexagonal pattern illustrated in FIG. 7, can be employed to fully utilize the available space in the retort. A motor 32 (FIG. 4) is used to drive the rotor. With both storage compartment patterns illustrated, the cans are loaded so that the longitudinal axis of the can is transverse or at 90° with respect to the rotational axis of the rotor. Hence, the cans are swung in an orbit with the cans inverted on one portion of each revolution and upright on another portion. This causes the air bubble in the can to move from one end of the can to the other. This causes mixing of the can contents which results in more uniform and thorough cooking and faster cooking time.

In the disclosed construction, in FIGS. 4 and 5, front legs 37 and 39 are provided. The lower ends 41 of the front legs are captured or confined by upstanding brackets 43 secured to the floor 45 and arranged to form sockets 57 for the legs. The legs 37, 39 are freely movable in the sockets and are slightly shorter than the rear legs 44, 45 so that when the legs 37, 39 are touching the ground the retort is tilted downwardly from left to right when viewed in FIG. 4 to provide gravity discharge of the cans from the discharge door. Similarly, the rear legs 44 and 45 are positioned in sockets 57 and are freely movable therein. A power cylinder 47, which can be double acting, is connected between a floor mounted bracket 48 and a fastening ear 50 on the retort housing. Use of the power cylinder enables precise control of the angle of tilt of the retort to facilitate loading and unloading of cans, as hereinafter described.

As illustrated in FIG. 3, a fill chute or ramp 60 is provided with a telescopic extension 63 with handles 62 to facilitate shifting the ramp for alignment with the compartments to be filled and moving the extension 63 in and out of the can compartments. The ramp 60 is desirably supported by a flexible and adjustable support such as a loop 63 supported by a hook and chain 64 from the building ceiling or a cross beam.

FIG. 6 illustrates a decelerating apparatus 70 which is intended to intercept cans delivered to ramp 72 from a can filling machine in a spaced arrangement and to maintain the spacing and decelerate movement to facilitate loading of the retort without banging and damaging cans which otherwise could occur as the cans roll down the ramp into the retort. The decelerator includes a conveyor belt 76 which has a lower run 78 which is pressed against the containers 80 by swing arms 82 provided with rollers 84. The swing arms 82 can be spring biased about their pivots 86 toward the belt 78 by springs 83. A motor 88 drives the shaft 90 by a drive train 92. The cans 80 exit the outlet of the decelerator at 94, one by one, and travel down the ramp 60 to the storage compartment on the rotor which is being filled.

FIG. 7 shows a modified embodiment in which the can compartments 100 are arranged in a hexagonal pattern to improve the capacity of the retorts.

In use, after the filled cans are loaded in the retort by filling each compartment individually, the retort is closed and the rotor rotated as shown, steam is introduced for cooking the can contents. The cans are turned end over end during the course of each revolution to cause movement of the air bubble in each can to travel through the can contents from one end of the can to the other. After a preselected cooking interval, the steam is turned off and compressed air introduced to maintain pressure. Water is introduced to reduce the temperature in the retort to 212° F. When the retort is cooled to 212° F., the air pressure is reduced and the cans allowed to cool.

I claim:

1. In a soup retort having a housing and a rotor contained within the housing, a motor for rotating the rotor about a rotational axis, a door at one end for axial loading and unloading of the retort, said rotor supporting a series of spaced can support racks which are oriented longitudinally of the retort so that the cans can be loaded through said door into said racks to tumble the cans in an end over end fashion during rotation of the rotor, the improvement for facilitating loading and unloading of the retort comprising lift means for tilting the retort rotational axis for elevating the end of the retort adjacent the doors to change the slope of the racks in an axial direction with respect to the horizontal to enable rolling of the cans into and from the storage racks along an axial path through said door to facilitate loading and unloading of said rotor through said door.

2. The improvement of claim 1 wherein said lift means comprises a hydraulic power cylinder connected between a support and said housing and a hydraulic circuit for actuating said cylinder when desired.

3. The improvement of claim 1 in combination with a supporting surface wherein the retort has legs and socket means on the supporting surface to confine the lower ends of the legs to positively position the retort and afford tilting of the retort.

4. The improvement of claim 1 including can loading means including a decelerating conveyor having a telescopic extension.

* * * * *